UNITED STATES PATENT OFFICE.

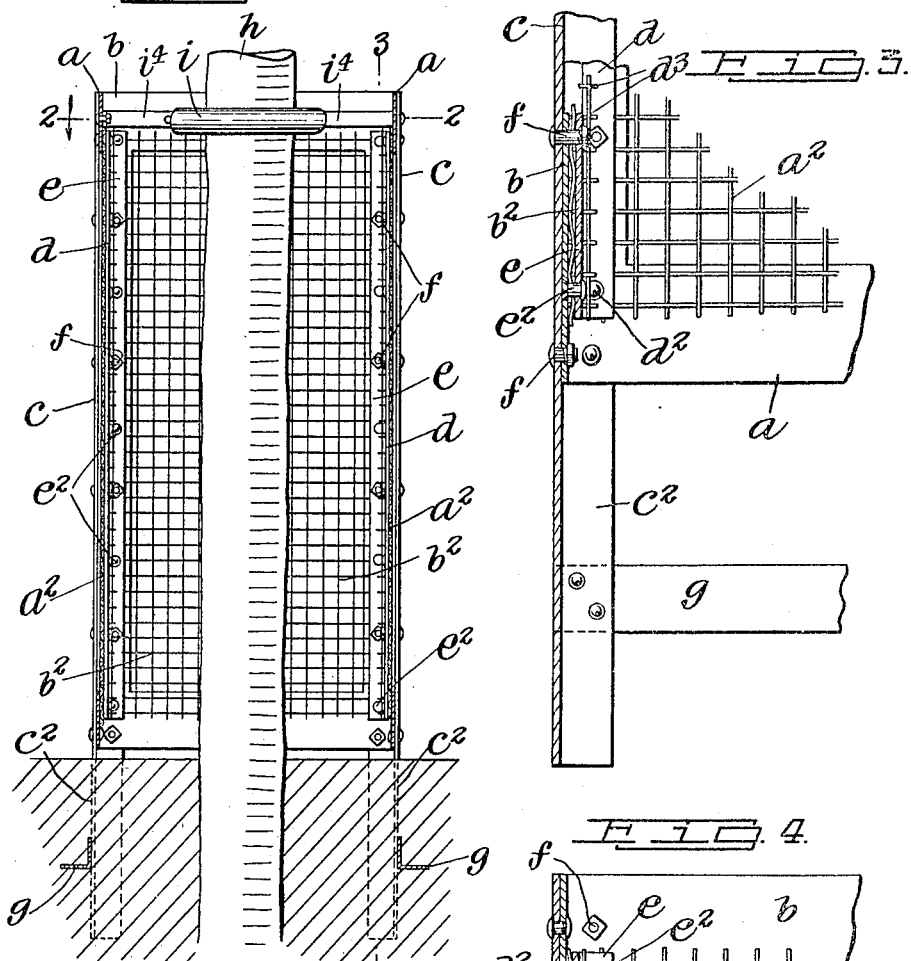

LOUIS BENDER, OF HOBOKEN, NEW JERSEY.

TREE-GUARD.

1,293,000. Specification of Letters Patent. Patented Feb. 4, 1919.

Application filed February 25, 1918. Serial No. 219,019.

*To all whom it may concern:*

Be it known that I, LOUIS BENDER, a citizen of the United States, and residing at Hoboken, in the county of Hudson and State of New Jersey, have invented certain new and useful Improvements in Tree-Guards, of which the following is a specification, such as will enable those skilled in the art to which it appertains to make and use the same.

This invention relates to tree guards or tree boxes such as are usually employed in cities, towns and similar places for the protection of new trees, and the object of this invention is to provide a tree guard of this class which is simple in construction, comparatively inexpensive, and which may be used or employed wherever such devices are required.

The invention is fully disclosed in the following specification, of which the accompanying drawing forms a part, in which the separate parts of my improvement are designated by reference characters in each of the views, and in which:—

Figure 1 is a sectional side view of a tree guard constructed according to my invention and showing the method of its use;

Fig. 2 a partial section on the line 2—2 of Fig. 1;

Fig. 3 a partial section on the line 3—3 of Fig. 1 and on an enlarged scale; and, Fig. 4 a partial section on the line 4—4 of Fig. 2 and also on an enlarged scale.

My improved tree guard is composed of sheet metal and wire mesh and is rectangular in form in cross section, and preferably square, and its transverse and vertical dimensions may be regulated or determined by the conditions or necessities of use.

The guard comprises two oppositely arranged side members $a$ which are the same in form and construction, and two other oppositely arranged side members $b$ which are also the same in form and construction, and four corner posts $c$ which are composed of angle iron L shaped in cross section and which are riveted to the side frame members $a$ and form parts thereof in the construction of the device.

Each of the side members $a$ is composed of sheet metal and is made in the form of an open frame, the opening being closed by wire mesh $a^2$, and the side frame members $b$ also consist of open frames, the openings in which are closed by wire mesh $b^2$.

The wire mesh $a^2$ is secured to the side frame members $a$ by strips $d$ riveted to said side frame members $a$ as shown at $d^2$, and the ends of the wire mesh are wrapped around the strips $d$, or the outer edges thereof as shown at $d^3$.

The side frame members $b$ are formed in the same manner, the wire mesh $b^2$ being secured to the frame members $b$ by strips $e$ riveted to said frame members $b$ at $e^2$, and the wire mesh $b^2$ is also folded around the outer edge portions of the strips $e$ as shown at $e^3$.

The side frame members $b$ are detachably connected with the corner posts $c$ by bolts $f$, all but one of which pass through the strips $e$, and this completes the structure of the body portion of the guard; and, in practice, the corner posts $c$ are provided at their lower ends with extensions $c^2$ which are countersunk in the ground, and which are connected at opposite sides by cross angle bars $g$ which form anchors by which the guard is secured in position.

In Figs. 1 and 2 of the accompanying drawing, I have shown at $h$ the body of a tree to be protected, and I also provide an attachment $i$ for my improved tree guard which is used at the top thereof and which is designed to center the tree in the guard and to protect it from coming in contact with the sides of the guard. This device comprises a circular body portion $i^2$ composed of separate parts and provided with a cushioning cover $i^3$ of rubber or other suitable material, and having oppositely directed side arms $i^4$ adapted to be detachably connected with the top of the body of the guard at $i^5$ by means of bolts or in any other way, and this device is also adapted to be mounted in the manner shown in Figs. 1 and 2 so as to inclose the body or trunk of the tree and hold it in proper position and prevent it from coming in contact with the sides of the guard, but said device is made the subject of a companion application filed by me of equal date herewith and is therefore not shown and described in detail in this case.

With my improved tree guard constructed, as herein described, the separate parts thereof may be disconnected and snugly packed together for shipment or other purposes, the side members $b$ fitting between the side frame members $a$, and said parts may be quickly and easily set up for use whenever necessary, and while I have shown and described the preferred method of constructing my improved tree guard, my invention is not limited to the exact details herein shown and described, and changes therein and modifications thereof may be made, within the scope of the appended claims without departing from the spirit of my invention or sacrificing its advantages.

It will be understood that the separate parts of my improved tree guard may be compactly folded together for shipment or other purposes in which event the side members *a* are placed together with their inner faces abutting, and the side members *b* are placed between the side members *a*, it being understood that the attachment *i* is removed, or disconnected from the sides *a* of the guard.

Having fully described my invention, what I claim as new and desire to secure by Letters Patent, is:—

1. A tree guard comprising a rectangular body portion composed of four approximately similar side members, two opposite side members of said body portion being provided at the side edges thereof with L-shaped corner posts which are permanently connected with said side members, means for detachably connecting the other opposite side members with said corner posts, said corner posts being provided with downwardly directed extensions and L-shaped cross pieces connected with the separate extensions of the first named side members to form anchor members therefor.

2. A tree guard comprising a rectangular body portion composed of four approximately similar side members, two opposite members of said body portion being provided at the side edges thereof with angle-iron corner posts, means for permanently securing said corner posts to said side members, and means for detachably connecting the other opposite side members with said corner posts.

3. A tree guard comprising a rectangular body portion composed of four approximately similar side members, two opposite side members of said body portion being provided at the side edges thereof with angle-iron corner posts, means for permanently securing said corner posts to said side members, means for detachably connecting the other opposite side members with said corner posts, the side members of said body portion being each composed of a sheet metal frame having a large elongated opening and a wire mesh body for closing the apertures in said members, the side edges of said wire mesh body being secured to the side edges of said members by sheet metal strips.

4. A tree guard comprising a rectangular body portion composed of four approximately similar side members, two opposite side members of said body portion being provided at the side edges thereof with angle-iron corner posts, means for permanently securing said corner posts to said side members, means for detachably connecting the other opposite side members with said corner posts, the side members of said body portion being each composed of a sheet metal frame having a large elongated opening and a wire mesh body for closing the apertures in said members, the side edges of said wire mesh body being secured to the side edges of said members by sheet metal strips, the angle-iron corner posts being provided with downwardly directed extensions and angle-iron cross pieces connected with the separate extensions of said first-named side members to form anchor members therefor.

In testimony that I claim the foregoing as my invention I have signed my name, in presence of the subscribing witnesses, this 21st day of February, 1918.

LOUIS BENDER.

Witnesses:
  C. E. MULREANY,
  H. E. THOMPSON.

Copies of this patent may be obtained for five cents each, by addressing the "Commissioner of Patents, Washington, D. C."